Jan. 14, 1964　　　　IWAO ARAI　　　　3,117,969
PROCESS FOR PRODUCTION OF MELAMINE
Filed March 15, 1961
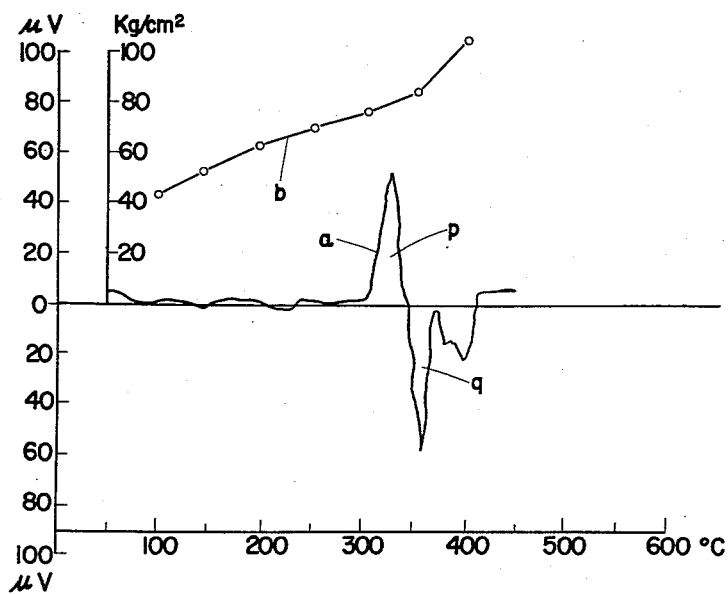
INVENTOR
*Iwao Arai*
BY
ATTORNEY

United States Patent Office 3,117,969
Patented Jan. 14, 1964

3,117,969
PROCESS FOR THE PRODUCTION OF MELAMINE
Iwao Arai, Toyama-ken, Japan, assignor to Nippon Carbide Kogyo Kabushiki Kaisha, Tokyo, Japan, a corporation of Japan
Filed Mar. 15, 1961, Ser. No. 95,935
Claims priority, application Japan Feb. 7, 1961
2 Claims. (Cl. 260—249.7)

This invention relates to the process for the production of melamine characterized in that liquid ammonia solution of at least one compound selected from the group consisting of dicyandiamide and cyanamide is heated in an atmosphere of mainly ammonia gas pressurized at least 50 kg./cm.$^2$ and more, to a temperature of above 300° C. but below the melting point of melamine preferably with rapidity.

In the past many processes have been known for production of melamine, such as heating dicyandiamide to above its melting temperature, or heating liquid ammonia solution of dicyandiamide or cyanamide. However in crude melamine, usually various impurities are contained such as melam, melem, ammeline, ammelide, and melon.

According to the present inventor's study, it was found that among those impurities particularly melam has a very adverse effect on refining operation or resinification of melamine. The solubility of melam in water, although is very low when cold, increases rapidly at a high temperature, when the melam content in melamine is above about 1.5%. Therefore the removal of melam in refining crude melamine by recrystallization from water becomes very difficult, making it virtually impossible to heighten the purity of the recrystallized melamine over 99%. Again in producing melamine resin by reacting melamine with formalin, the melam present as an impurity impairs the stability of the aqueous solution of methylolmelamine or its precondensation product, and makes said solution milk white. Thus the presence of melam brings several disadvantages.

Usually the recrystallization from water is one of the most advantageous processes for refining crude melamine on an industrial scale. However, while other impurities present in crude melamine can be separated and removed with relative ease by recrystallization process, being extremely hard-soluble both to cold and hot water, melam is very difficult to be removed, because its solubility in water, although is very small when cold, increases rapidly when the water is hot. Therefore if a process to produce crude melamine having particularly low melam content is perfected, it must be said that its industrial value is very high.

Accordingly, the object of the present invention is to provide a process for manufacture of melamine of high purity, particularly of low melam content, and moreover at high yield.

The other objects and advantages of the present invention will be apparent from the following descriptions.

In the present invention, the above object is accomplished by heating liquid ammonia solution of dicyandiamide and/or cyanamide in an atmosphere of mainly ammonia gas, the pressure of the ammonia being at least 50 kg./cm.$^2$, to a reaction temperature of above 300° C. but below the melting point of melamine as rapidly as possible.

By the study of the present inventor, it was revealed that in the production of melamine from liquid ammonia solution of dicyandiamide or cyanamide, there is a very close relationship between the reaction temperature and the degree of purity of the obtained melamine; and between the former and the amount of melam produced as the by-product.

As the illustration, if an example is given, when a solution wherein the weight ratio of dicyandiamide to liquid ammonia was 1:1.15 was treated in accordance with Example 1 which shall be described later but at various temperatures, and the contents of the main impurities in the obtained crude melamine were examined, the results were as shown in Table I below.

TABLE I

| Reaction Temp. (° C.) | 270 | 280 | 290 | 300 | 310 | 315 | 320 | 330 | 340 |
|---|---|---|---|---|---|---|---|---|---|
| Composition of Crude Melamine (Weight percent): | | | | | | | | | |
| Melamine | 94.–96.0 | 95.6–96.2 | 95.8–96.3 | 96.0–96.4 | 96.3–96.9 | 96.8–97.4 | 97.5–98.9 | 98.2–98.5 | 98.3–98.7 |
| Melam | 1.6–2.4 | 1.4–2.1 | 1.2–1.7 | 1.2–1.6 | 0.9–1.4 | 0.7–1.0 | 0.4–0.7 | 0.1–0.3 | below 0.1 |
| Melem | 1.2–1.7 | 1.2–1.7 | 1.2–1.7 | 1.2–1.7 | 1.2–1.7 | 1.2–1.7 | 1.2–1.7 | 1.1–1.5 | 0.8–1.4 |
| Ammeline | 0.15–0.4 | 0.15–0.4 | 0.15–0.4 | 0.15–0.4 | 0.15–0.4 | 0.15–0.4 | 0.15–0.4 | 0.1–0.2 | 0.1–0.2 |

As is apparent from the above Table I, while at the reaction temperature below 280° C. the by-produced melam content in the obtained crude melamine is about 1.5–2.0% and greater, the by-produced melam content decreases at a higher temperature, with a relative rapidity from up above 300° C. adopted in the present invention. Particularly, at above 310° C. it can be seen the melam content is remarkably reduced.

In connection with the above result, the present inventor discovered a very interesting fact from another standpoint. That is, the present inventor obtained pure melam from a large amount of crude melamine by alkali treatment, and after confirming its identity by concurrent use of the ion-exchange chromatography and the measurement of ultraviolet absorption curve, and also by elementary analysis and other methods, examined the behavior of melam under heating by subjecting the thus obtained melam to differential thermal analysis under superatmospheric pressure. As the result, a graph as in the attached drawing was obtained. Said differential thermal analysis was carried out in such a manner that, of the two sample containers in an autoclave of 450 cc. capacity, one was filled with 1.5 g. of melam and 19.0 g. of liquid ammonia, while the other, with about equal amount of alumina as control and also 19.0 g. of liquid ammonia, said autoclave being heated at the rate of 5° C./min. At 100° C. the pressure showed about 43 kg./cm.$^2$, at 300° C., about 70 kg./cm.$^2$, and at 350° C., about 80 kg./cm.$^2$. The curve $b$ in the attached drawing illustrates this pressure variation.

The exothermal value is shown by the curve $a$ of the attached drawing. As can be understood from the behavior of the curve $a$, at a temperature above 300° C. a rapid evolution of heat was recognized forming a peak $p$ in the drawing, and at about 340° C. the evolution of heat ceased.

Further, when the temperature was raised about to 345° C., an intense heat absorption started to take place, as shown by the valley $q$ in the drawing.

And, the analysis of the reaction product confirmed the formation of melamine.

From the above data, it is presumed that the peak $p$ apparently represents the heat evolved by the reaction of melam and ammonia to form melamine, and also that the valley $q$ at above 345° C. represents the heat of melting of melamine. Thus the fact that the formation of melamine from melam suddenly starts at 300° C. and higher perfectly corresponds with the phenomenon that from 300° C. upward the melam content of crude melamine rapidly decreases as shown in Table I.

Further it is as explained in the foregoing that when employment of the conventional recrystallization process from water, one of the industrially advantageous processes for manufacture of refined melamine containing above 99% pure melamine as is normal in the "pure melamine" commercially available, is desired, the less is the melam content of the crude melamine, the better. When the melam content of crude melamine becomes below about 1.0%, the refining of the same by recrystallization process to obtain melamine of above 99% purity is rendered very easy.

Consequently, from the above standpoint it is particularly preferable to employ a reaction temperature of 310° C. or higher at the time of formation of melamine.

On the other hand, the known melting point of pure melamine being 354° C., that of crude melamine is usually a little lower than that due to the presence of impurities, and thus too high a temperature may cause sintering and solidification of the produced melamine as described later, hindering the smooth progress of the operation. Therefore it is desirable in normal circumstances to set the upper limit of the reaction temperatures employed in the present invention at 345° C.

Further in the present invention it is as indicated by the results in Table I that among so specified reaction temperature range as above 300° C. but below melting point of melamine, preferably 310° C.–345° C., as high a temperature as feasible is particularly preferred.

Also the reason why the reaction temperature is restricted as below melting point of melamine in this invention is that, with the reaction temperature of above melting point of melamine, the melted product melamine is solidified when cooled, and adhered to the inside of the autoclave when the same should be taken out, making the taking-out operation very difficult. Thus a temperature above melting point of melamine cannot be used industrially from the practical standpoint.

Again according to the study of the present inventor, in a reaction to form melamine by rapidly heating liquid ammonia solution of dicyandiamide and/or cyanamide as in this invention, accompanying the increase of pressure in the autoclave, the pure melamine content of the product is increased approximately in proportion, and the melam content is decreased again approximately in proportion. However melem content in the product is not so explicitly influenced by the change of pressure as in the case of melam, and moreover it was found that the ammeline content has substantially no relationship with pressure variation.

As an illustration, the relationship among the pressure condition, degree of purity of product crude melamine and the melam, melem, and ammeline contents of said crude melamine was examined as to the case wherein the reaction is carried out employing the conditions of Example 1 as set forth later, but with various pressures of the ammonia gas in the autoclave arranged by controlling the discharge rate of ammonia gas from the autoclave. The results obtained were as shown in Table II below.

As is apparent from the above Table II, with the pressure in the reaction system of above 50 kg./cm.$^2$, particularly above 55 kg./cm.$^2$, not only the degree of purity of the obtained crude melamine becomes high, but also its melam content decreases rapidly, resulting in easy refining of the crude melamine and consequently, production of melamine of high purity.

Again it has been already known in the production of melamine from liquid ammonia solution of dicyandiamide and/or cyanamide, that the high pressure of the ammonia gas in the autoclave results in increase of melamine yield, the high pressure prohibiting the side reaction, deammonization of melamine.

Thus, to maintain the pressure of the gas mainly of ammonia in the autoclave above 50 kg./cm.$^2$, particularly 55 kg./cm.$^2$ as in this invention is a critical condition for manufacture of high purity melamine, as such enables production of melamine at a high yield as well as remarkable decrease in melam content, and moreover improves the purity of the crude melamine.

The present inventor also discovered that it is an important requirement for production of crude melamine of high purity, to heat the liquid ammonia solution of dicyandiamide and/or cyanamide with as much rapidity and uniformity as possible to above 300° C., particularly above 310° C. but below melting point of melamine.

For this purpose, the most effective is to cause the contact of liquid ammonia solution of dicyandiamide and/or cyanamide with a heating medium of as great a heat capacity as possible which is heated to a temperature above the desired reaction temperature, of course above 300° C., by jetting and contacting the ammonia solution against said heating medium with suitable amount of flow.

As the heating medium, those having a great heat capacity and moreover high resistivity to ammonia are preferred, such as iron, or an alloy thereof such as stainless steel, or other metals or alloys.

In this invention, such heating medium may be provided at a suitable place in the autoclave in the form of plate, rod, ball, or mass, or the inner wall of the autoclave may be used as the heating medium. And as already mentioned, these heating media should be positively heated to above the desired temperature, above 300° C., by direct or indirect heating means such as electric heat, or "Dowtherm."

When liquid ammonia solution or dicyandiamide and/or cyanamide is heated to above 300° C. but below melting point of melamine rapidly and uniformly by being jetted against the inner surfaces of an autoclave which has been heated to above 300° C. and thus being contacted in accordance with the preferred mode of practicing this invention, immediately after the starting of the reaction the product melamine adheres and piles up in layer over the inner surfaces of the autoclave to which said ammonia solution impinges. And, by the study of the present inventor, so adhered melamine layer prevents the rapid and uniform heating of the liquid ammonia solution of dicyandiamide and/or cyanamide jetted against said layer, resulting in the lowering of the purity of the obtained crude melamine as well as increase in its melam content. In such a case, therefore, higher purity crude melamine can be obtained by constantly scraping off the product melamine continuously adhering and piling up in layer on the surfaces of the heating medium

TABLE II

| Reaction Pressure, kg./cm.$^2$ | 43 | 51 | 55 | 74 | 80 |
|---|---|---|---|---|---|
| Composition of Crude Melamine (Weight percent): | | | | | |
| Melamine | 91.1–94.3 | 95–2.96.6 | 96.5–97.5 | 98.0–98.5 | 98.1–98.5 |
| Melam | 3.0–4.0 | 1.0–1.2 | 0.7–0.9 | 0.1–0.3 | 0.1–0.2 |
| Melem | 4.0–4.5 | 2.5–3.5 | 2.0–3.0 | 1.2–1.5 | 1.1–1.5 |
| Ammeline | 0.2–0.3 | 0.2–0.3 | 0.2–0.3 | 0.1–0.2 | 0.1–0.2 | to which said solution is jetted, such as the inner surfaces of the autoclave, for example, by means of a stirrer.

Therefore, in practicing this invention industrially, an autoclave equipped with positive heating means to heat the inner surfaces of said autoclave, and also with a stirrer having wings, preferably provided as close to said inner surfaces as possible, is advantageously used. The most preferred practice is such that the liquid ammonia solution of dicyandiamide and/or cyanamide is continuously jetted against said inner surfaces in an amount of flow as will not lower the temperature of said inner surfaces below 300° C., while the zone of said inner surfaces of the autoclave to which said ammonia solution impinges and the neighbouring zones thereto in the autoclave being maintained at a temperature above 300° C. but below melting point of melamine and the pressure of the gas mainly of ammonia gas in the autoclave being maintained above 50 kg./cm.$^2$, particularly above 55 kg./cm.$^2$.

Next the present invention shall be explained as to examples, it being understood that the following examples are given for only illustration purposes showing some examples of modes of practicing this invention, and that the present invention is by no means thereby limited.

*Example 1*

Eighty-one (81) liters of liquid ammonia solution of dicyandiamide preheated to 130° C. in advance (dicyandiamide 30 kg., liquid ammonia 35 kg.) were continuously fed at the flow rate of 10 l./min. against the heated inner surfaces of an autoclave made of stainless steel having a capacity of 200 l. equipped with a heating jacket and scraper, preferably to the zone of said inner surfaces located apart from the zone whereon the produced melamine fell and piled up.

Meanwhile the ammonia atmosphere in the autoclave was constantly maintained at 70 kg./cm.$^2$ by controlling the ammonia gas out-let valve, and by maintaining the Dowtherm in the heating jacket at 335–345° C., the reaction temperature of conversion of fed dicyandiamide to melamine was kept at 330° C.±2° C., care being taken that the heat of Dowtherm in the jacket should be conducted swiftly to the zone where the dicyandiamide is being converted to melamine. Also by continuous operation of the scraper in the autoclave which is provided facing the inner surfaces at the clearance of average 2–3 mm., the adhering and piling up of melamine on the inner surfaces of the autoclave was prevented.

After all of the liquid ammonia solution of dicyandiamide was charged into the pressurized autoclave, the pressure of the autoclave was removed and the formed melamine was taken out. 29.5 kg. of the product was obtained.

Thus obtained crude melamine had a purity of 98.3%, and contained the by-produced impurities at such a ratio as: melam, 0.2%; melem, 1.3%; and ammeline, 0.13%.

*Example 2*

Under the similar conditions to those of Example 1 and by way of comparison, a solution comprising 30 kg. of dicyanidamide and 35 kg. of liquid ammonia was fed continuously to a similar autoclave, except that in this example the clearance between the scraper and the inner surfaces of the autoclave was extended to average 10–15 mm., thus permitting more melamine to pile up on the inner surfaces of the autoclave. 29.4 kg. of the product was obtained.

The product melamine of the above had a purity of 95.7%, and contained the by-produced impurities at such a ratio as: melam, 2.0%; melem, 1.6%; and ammeline, 0.4%. This example illustrates that the additional amount of melamine adhering to the inner surfaces of the autoclave prevented proper heating of the ammonia solution and resulted in a poorer product.

*Example 3*

A similar autoclave equipped with a scraper as used in Example 1 was charged with 81 liters of liquid ammonia solution of dicyandiamide comprising 30 kg. of dicyandiamide and 35 kg. of liquid ammonia, which had been preheated to 120° C. in advance, at a flow rate of 3 l./min. The reaction was carried out under the pressure of 60 kg./cm.$^2$ of the ammonia gas.

In this reaction, the reaction temperature used was 325–330° C., effected by maintaining the temperature of the Dowtherm in the jacket at 330–340° C. When the feeding of all the ammonia solution of dicyandiamide was so completed under said pressure, the ammonia gas was discharged to lower the pressure, and the product was taken out. Thus obtained crude melamine had a purity of 98.0% and contained the by-produced impurities at such a ratio as: melam, 0.4%; melem, 1.4%; and ammeline, 0.15%.

*Example 4*

Three-hundred and sixty-five (365) liters of liquid ammonia solution of dicyandiamide comprising 122 kg. of dicyandiamide and 166 kg. of liquid ammonia, which had been preheated to 130° C. in advance were reacted in the similar autoclave equipped with scraper as in Example 1, being fed at the flow rate of 3 l./min. under the similar conditions as in Example 1 including the ammonia gas pressure.

The reaction temperature employed was 320–330° C., effected by maintaining the temperature of the Dowtherm in the jacket at 335–345° C.

After all the liquid ammonia solution of dicyandiamide was injected into the autoclave with pressure, the inner pressure of the autoclave was removed, and 120 kg. of the produced crude melamine were taken out.

The purity of the product was 97.5%, and impurities were present in such a ratio as: melam, 0.6%, melem, 1.4%; and ammeline, 0.4%.

After having set forth the gist of the present invention as in the foregoing, what the present inventor claims is:

1. A process for the production of melamine which comprises injecting a stream of a liquid ammonia solution of a compound selected from the group consisting of dicyandiamide and cyanamide into a heating zone against the surface of a hot, inert, solid medium in said heating zone, whereby said solution is rapidly heated to a temperature above about 300° C. but below the melting point of melamine, and solid melamine is formed on said heat-carrying solid medium surface, and continuously scraping said solid melamine off the surface of said heat-carrying solid medium, said heating zone containing an ammonia gas atmosphere maintained at a pressure of at least about 50 kg./cm.$^2$.

2. The process according to claim 1 wherein said heat-carrying solid medium is an inner wall of said heating zone.

References Cited in the file of this patent

UNITED STATES PATENTS

| 2,164,705 | Fisch | July 4, 1939 |
|---|---|---|
| 2,170,491 | Widmer et al. | Aug. 22, 1939 |
| 2,191,361 | Widmer et al. | Feb. 20, 1940 |

FOREIGN PATENTS

| 814,934 | Great Britain | June 17, 1959 |